No. 670,146. Patented Mar. 19, 1901.
L. BURRELL.
POSITIVE WATER METER.
(Application filed Apr. 27, 1900.)
(No Model.) 3 Sheets—Sheet 1.
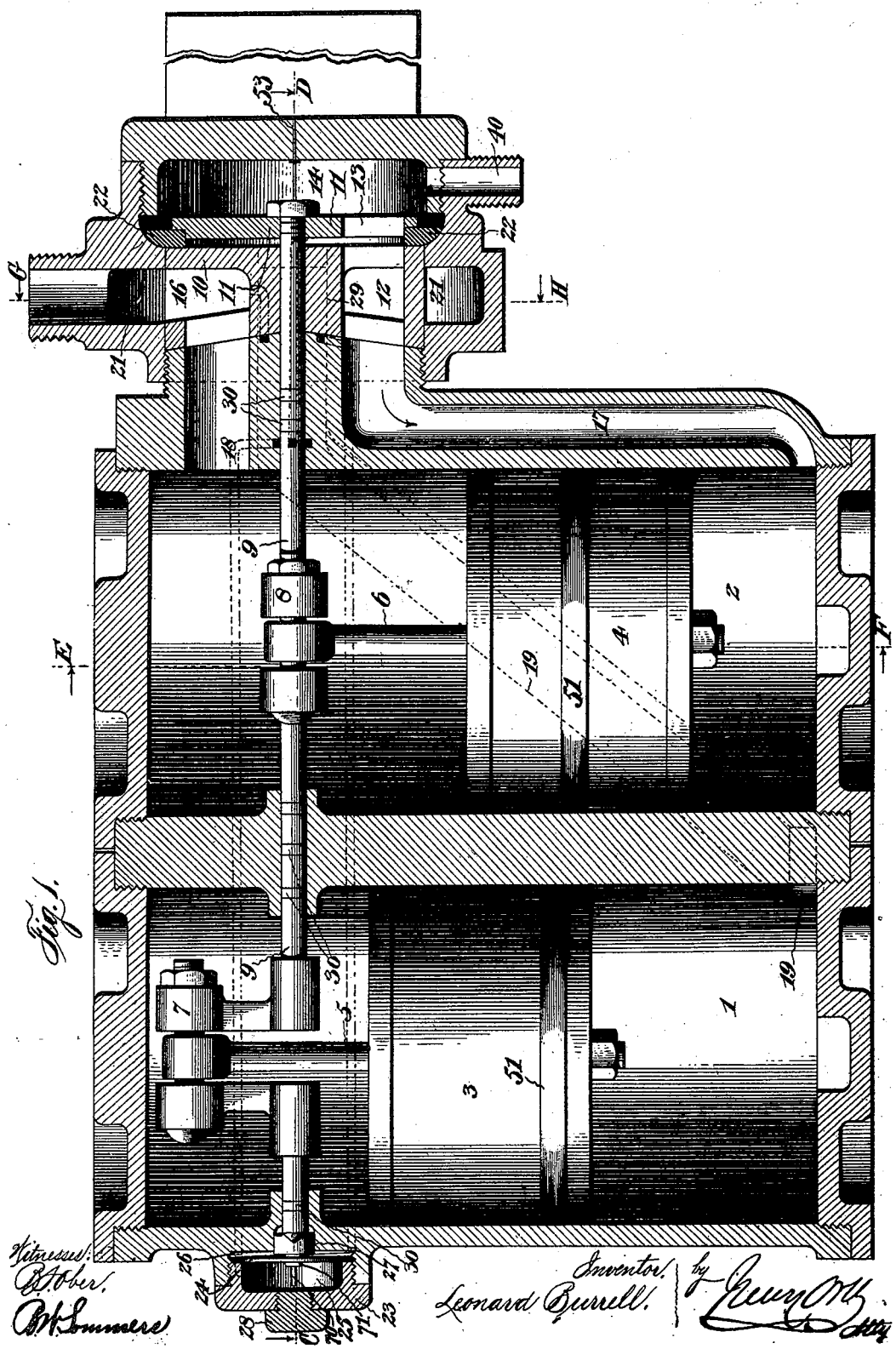
Witnesses: Inventor:
Leonard Burrell.

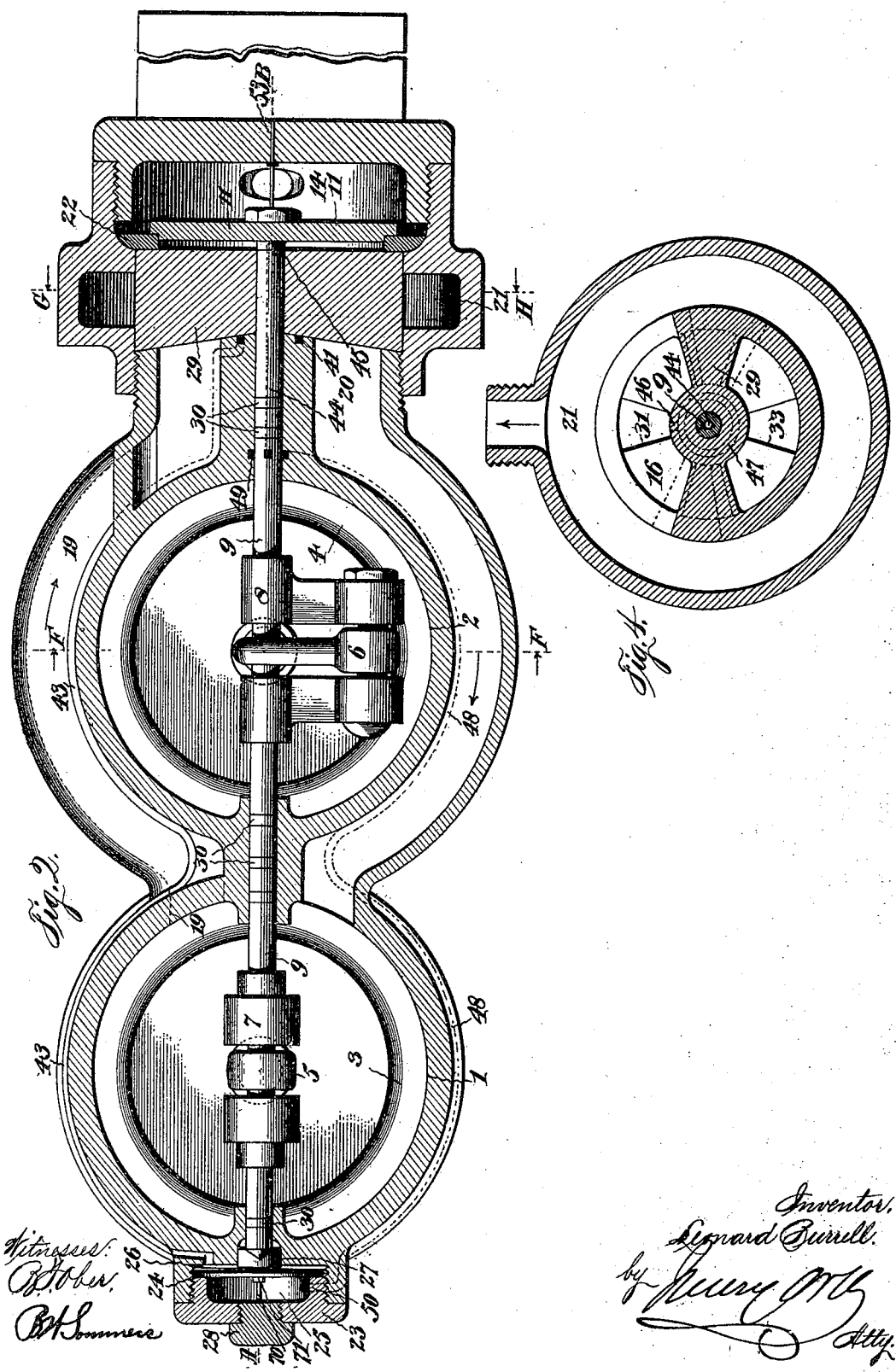

No. 670,146. Patented Mar. 19, 1901.
L. BURRELL.
POSITIVE WATER METER.
(Application filed Apr. 27, 1900.)
(No Model.) 3 Sheets—Sheet 3.
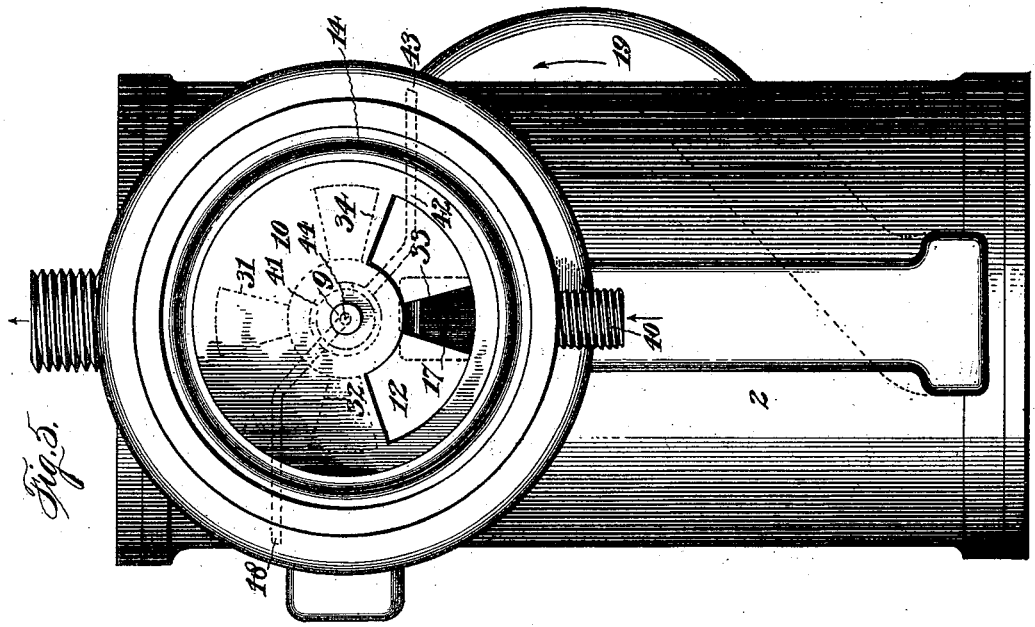
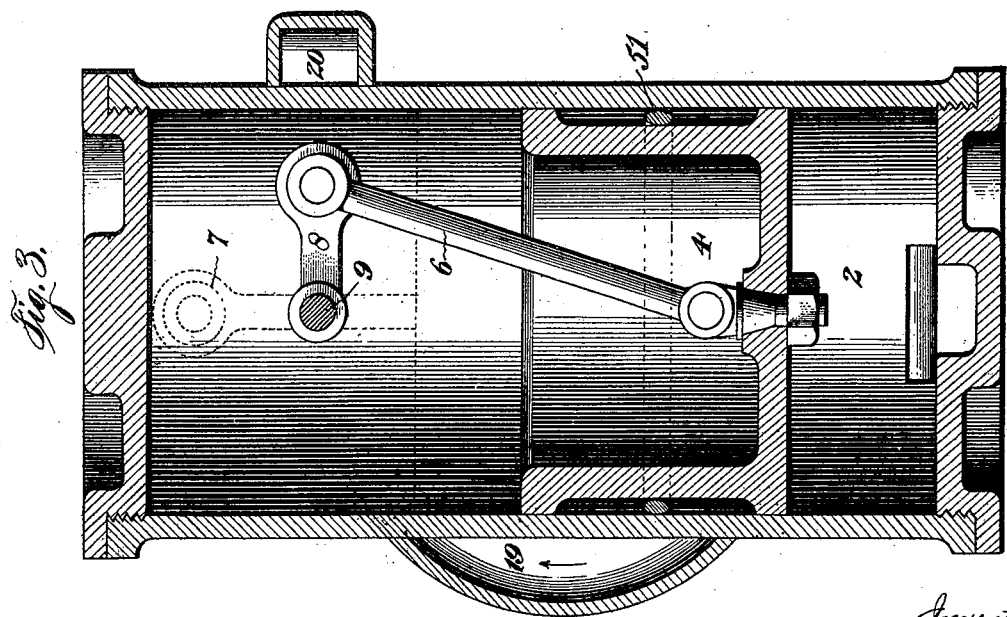
Witnesses:
Inventor
Leonard Burrell,

UNITED STATES PATENT OFFICE.

LEONARD BURRELL, OF RIO DE JANEIRO, BRAZIL.

POSITIVE WATER-METER.

SPECIFICATION forming part of Letters Patent No. 670,146, dated March 19, 1901.

Application filed April 27, 1900. Serial No. 14,608. (No model.)

*To all whom it may concern:*

Be it known that I, LEONARD BURRELL, civil engineer, a subject of the Queen of Great Britain, residing at 37 Rua Santa Luzia, in the city of Rio de Janeiro, in the Republic of Brazil, have invented certain new and useful Improvements in Positive Water-Meters, to be applied also to hydraulic motors, of which the following is a specification.

My invention relates to water-meters and is also applicable to hydraulic motors, and has for its object the provision of simple mechanism positively driven, whereby the water passing through the meter is automatically measured, a valve controlling the distribution of water and a registering mechanism, both driven from the crank-shaft, and other features which will be hereinafter pointed out.

Referring to the drawings, in which like parts are similarly designated, Figure 1 is a vertical longitudinal section on line A B of Fig. 2. Fig. 2 is a horizontal section on line C D of Fig. 1, the crank and shaft being shown in plan. Fig. 3 is a vertical cross-section on lines E F of Figs. 1 and 2. Fig. 4 is an end view with the cap of the distributing-valve chamber removed, and Fig. 5 is a section on lines G H of Figs. 1 and 2 through the valve and its ports.

In the two vertical cylinders 1 and 2 are hollow cylinder-pistons 3 and 4, having hinged to their heads piston-rods 5 and 6, which are connected to cranks 7 and 8, set approximately at ninety degrees to one another and on a common shaft 9. Packing-rings 51 on each cylinder, here shown as round rolling-rings, are adapted to make a sufficiently tight joint between the two ends of the cylinders.

From a common distributing-chamber 14 water is distributed by means of a valve to the passages 17, leading to the bottom, and 18, leading to the top, of the near cylinder 2, and 19, leading to the bottom, and 20, leading to the top, of the far cylinder 1.

The shaft 9 passes through both of the cylinders 1 and 2 near their upper ends, is journaled in their walls, provided with suitable packing-rings 30, and carries on one end a distributing-valve 10 and a disk 11 and a spindle 53, which spindle is adapted to operate the prime mover in any well-known registering apparatus, (not shown;) but when used as a motor the shaft 9 will be prolonged through the casing, which will then be provided with a suitable stuffing-box and gland.

The cylindrical distributing-valve 10, rigidly secured on the end of the driving-shaft 9, has an approximately semicircular pass 12 through its end, in register with which is secured the opening 13 in the disk 11, so as to allow free passage through both disk and valve of the incoming water from the distributing-chamber 14 of the pump-casing. The other half of said valve, which is separated from the pass 12 by a dividing-wall 29, is closed on the end toward the distributing-chamber, but has an opening 16, that opens communication between the respective channels and the common annular outlet-chamber 21.

The disk 11 is screwed on the end of the shaft and carries between it and the valve 10 a flexible annular packing 22, bearing against a seat formed in the casing, said packing preventing leakage between the distributing-chamber 14 and the outlet-chamber 21, which are separated from one another by the distributing-valve. On the opposite end of the shaft, opposite the distributing-valve, is a chamber 23, closed by a hand-hole cover 28 and divided by a flexible partition or diaphragm 24 into two compartments, one of which, 25, is always in communication with incoming water and the other, 26, with exhaust or outlet water, so that a preponderance of pressure will be toward the valve end of the crank-shaft, and this partition has an end bearing 27 for the said shaft, whereby the longitudinal thrust tending to displace the shaft due to the force of the incoming water on the valve 10 and disk 11 is partially or wholly compensated. Water for this compensation is obtained through the following channels: The water from the exhaust side of the pump is conveyed by duct 46 to an annular groove 41 between the valve 10 and the face of the abutting casing, whence it is led by a pipe 43 to the chamber 26 of the balancing-diaphragm, and water from the inlet side of the pump is taken by a duct 44, that has an opening 45 between the disk 11 and valve 10 to an annular groove 49, thence by pipe 48, opening at 50, into the chamber 25.

This end bearing 27 is shown adjustable to and from the diaphragm by means of a screw 70, secured to the bearing, screwed into and passing through said diaphragm, and a lock-nut 71 to hold it in place.

The operation will be as follows: Starting with the position of the parts shown in Fig. 1, water enters, by means of the pipe 40, into the distributing-chamber 14 through the opening 13 in the disk, the pass 12 in the cylindrical distributing-valve 10, and the passage 17 to the bottom of cylinder 2, forcing the piston 4 upward and at the same time enabling water to exhaust from the top of the cylinder 2 through the passage diametrically opposite to the passage or port and through the outlet side of the valve into the annular exhaust or outlet chamber. At the same time also the two passages or ports 32 34, leading to cylinder 1, are closed, when on continued movement the port 32, leading to the passage 20 above the piston 3, is about to open to admit water from the inlet-chamber 14, and at the same time the port 34, leading to the passage below the piston 3, is also to open, thus allowing simultaneous inlet and outlet. In a similar manner during the rotation of the valve the ports 31 and 34, leading, respectively, to the passages 18 and 17, are controlled to operate the piston 4.

Having now described and ascertained the nature of my said invention and the manner in which it is performed, I declare that what I claim is—

1. In a water-meter, cylinders, pistons therein, cranks arranged at right angles to one another and connected to a common shaft, inlet and outlet ports for each cylinder, a valve rigidly secured to said shaft and arranged to admit water longitudinally and exhaust water peripherally therethrough, substantially as set forth.

2. In a water-meter, cylinders, pistons therein, cranks arranged at right angles to each other on a shaft and connected to said pistons, inlet and outlet ports for each cylinder, a valve secured to said shaft, an annular exhaust-chamber, an inlet-chamber arranged to embrace the end of said valve and ports arranged to admit water longitudinally and exhaust water laterally through said valve, the latter arranged to separate the inlet and exhaust chambers, substantially as set forth.

3. In a water-meter, cranks set at right angles on a common shaft, a pair of cylinders, pistons therein connected to said cranks, inlet and outlet passages for each cylinder terminating in diametrically-arranged ports, a cylindrical distributing-valve carried by said shaft, an inlet and outlet chamber separated by said valve, an inlet-pass through said valve from end to end and an outlet-pass through its periphery adapted to place the ports in communication with their respective chambers, substantially as described.

4. In a water-meter, a pair of cylinders, pistons therein connected to a common crank-shaft, inlet and outlet ports for each cylinder, a valve carried on one end of said shaft to admit and exhaust water from said cylinders through said ports and means for applying water-pressure on the opposite end of said shaft, whereby the pressure on the valve is counterbalanced, substantially as described.

5. In a water meter or motor, a pair of cylinders, pistons therein connected to a common crank-shaft, inlet and outlet ports for each cylinder, a cylinder-valve carried on one end of said shaft to admit and exhaust water from said cylinders through said ports and a chamber divided by a diaphragm, an adjustable end bearing for the shaft on said diaphragm, means for admitting water to the chamber, whereby the pressure on the valve is counterbalanced, substantially as described.

6. In a water-meter, the combination with the crank-shaft, of a pair of parallel cylinders on one side thereof, cranks set at right angles on said shaft, a rotary valve on said shaft, an inlet-port longitudinally and an outlet-port peripherally through said valve and controlling a passage from one end of each of said cylinders, and means for compensating for the thrust on the shaft, substantially as set forth.

7. In a machine of the class described, cylinders, pistons therein connected to a common crank-shaft, inlet and outlet ports for each cylinder, a valve rigidly secured to said shaft, a disk organized to hold a packing-ring against the valve and casing, an annular exhaust-chamber and an inlet-chamber separated from each other by said valve, and an inlet-pass longitudinally and an outlet-pass laterally through said valve, substantially as described.

8. In a machine of the class described, cylinders, pistons therein connected to a common crank-shaft, inlet and outlet ports for each cylinder, an annular exhaust-chamber and an inlet-chamber separated by a cylindrical valve rigidly secured to the end of said shaft, and a water-chamber at the other end of said shaft, and mechanism therein influenced by the differential pressure of inlet and exhaust water and organized to take up end thrust on said shaft, substantially as described.

In testimony whereof I have hereunto set my hand in presence of two subscribing witnesses.

LEONARD BURRELL.

Witnesses:
JULES GÉRAUD,
S. F. BUTCHER.